(12) United States Patent
Mock et al.

(10) Patent No.: US 7,705,728 B2
(45) Date of Patent: Apr. 27, 2010

(54) SELECTIVELY SENDING NOTIFICATIONS WHEN AN OBJECT TRACKING DEVICE IS OUTSIDE A RANGE OF AN ANCHOR BEACON

(75) Inventors: Von A. Mock, Boynton Beach, FL (US); Eric T. Eaton, Lake Worth, FL (US); David J. Hayes, Lake Worth, FL (US)

(73) Assignee: Motorola, Inc., Schaumberg, IL (US)

( * ) Notice: Subject to any disclaimer, the term of this patent is extended or adjusted under 35 U.S.C. 154(b) by 371 days.

(21) Appl. No.: 11/612,459

(22) Filed: Dec. 18, 2006

(65) Prior Publication Data

US 2008/0143516 A1    Jun. 19, 2008

(51) Int. Cl.
G08B 1/08    (2006.01)
(52) U.S. Cl. .............................. 340/539.13; 340/539.14
(58) Field of Classification Search .............. 340/539.1, 340/539.11, 539.13, 539.14, 539.21, 573.1, 340/573.4, 825.49, 5.81, 10.4; 235/375; 702/200, 207; 455/456.1, 457
See application file for complete search history.

(56) References Cited

U.S. PATENT DOCUMENTS

| | | | |
|---|---|---|---|
| 5,963,130 A | 10/1999 | Schlager et al. | |
| 6,362,778 B2 | 3/2002 | Neher | |
| 6,889,135 B2 * | 5/2005 | Curatolo et al. ............. 701/207 | |
| 6,967,576 B2 | 11/2005 | Hayes et al. | |
| 7,039,427 B2 * | 5/2006 | Tachikawa ................... 455/457 |
| 7,098,786 B2 | 8/2006 | Dvorak et al. | |
| 7,146,178 B2 * | 12/2006 | Lehikoinen et al. ...... 455/456.1 |
| 2002/0021231 A1 | 2/2002 | Schlager et al. | |
| 2004/0145520 A1 | 7/2004 | Richardson et al. | |
| 2004/0156326 A1 | 8/2004 | Chithambaram | |
| 2005/0068169 A1 | 3/2005 | Copley et al. | |
| 2005/0240959 A1 | 10/2005 | Kuhn et al. | |
| 2007/0023496 A1 * | 2/2007 | Hall ........................... 235/375 |
| 2008/0274752 A1 * | 11/2008 | Houri ...................... 455/456.1 |

FOREIGN PATENT DOCUMENTS

EP    1441235 A2    7/2004
WO    0173466 A1    10/2001

* cited by examiner

*Primary Examiner*—Van T. Trieu
(74) *Attorney, Agent, or Firm*—Patents on Demand, P.A.; Brian K. Buchheit; Scott M. Garrett (57) ABSTRACT

A method of tracking objects uses an anchor beacon that can emit a broadcast over a range that is detectable by an object tracking device. The object tracking device can automatically detect a presence or absence of the broadcast. When the broadcast is present, the object tracking device can take no action. When the broadcast is absent, the object tracking device can determine a current location for the object tracking device and can convey an OTA communication to a tracking server. The OTA communication can indicate the absence of the broadcast and can also including the current location. The tracking server can selectively send a notification to a previously designated communication device to notify a user that the object tracking device is outside the range.

13 Claims, 4 Drawing Sheets

SELECTIVELY SENDING NOTIFICATIONS WHEN AN OBJECT TRACKING DEVICE IS OUTSIDE A RANGE OF AN ANCHOR BEACON

BACKGROUND

1. Field of the Invention

The present invention relates to mobile telecommunications and, more particularly, to selectively sending notifications; when an object tracking device is outside a range of an anchor beacon.

2. Description of the Related Art

The ability to use electronic tracking and/or location determination devices is becoming a popular means to automatically determine the location of designated objects. For example, it is becoming a standard feature for mobile telephones to be equipped with Global Positioning System (GPS) components, which permit precise location determinations for emergency 911 calls. This feature also allows associated functions to be added to a mobile device, such as a GPS navigational capability. This type of electronic tracking is also often used in shipping systems to track packages and in the automotive industry to provide anti-theft and protection services.

In addition to locating objects, this technology is used in a number of geo fencing solutions to establish permitted geographical zones. For example, a mobile telephone that includes GPS components and a geo fencing feature can be configured by a family member, such as a parent, to establish permitted zones for school, work, friends' houses, malls, and the like, for the carrier of the mobile telephone. Notifications can be automatically sent to the parent's mobile telephone when a monitored family member, such as a child, enters or leaves any of the established zones. Notifications can also be issued when a mobile telephone travels over an established speed, which presumably indicates a child or teen is traveling in a vehicle at excessive speeds.

A number of circumstances exist, where a user wants to establish geo fence boundaries based upon a fixed reference point or safe zone. For instance, a pet owner may desire to establish a geo fence about the owner's house that represents a safe zone for the pet. Current solutions require users establish a set of geographical coordinates, such as GPS coordinates for a geo fence zone, which can be complicated or at least inconvenient for many users. It is believed that many of these users would prefer to be able to set an anchor beacon with a user adjustable range, where the geo fence boundary can be based upon this range. Such a capability is not currently available using any known solution.

SUMMARY OF THE INVENTION

The present invention discloses a solution for associating an object tracking device with one or more anchor beacons, which can he a fixed device or a mobile device. Each anchor beacon can emit a signal which is received by the object tracking device. When within a signal range, the object tracking device is believed to be in a safe region, and no action is taken. When outside the range, however, the object tracking device can send a notification to a remotely located tracking server using an Over the Air (OTA) communication. The OTA communication can be any wireless communication sent over a wireless network. The tracking server can then determine whether to send a notification to a caretaker's computing device to inform the caretaker of the tracked object's current position. In one embodiment, a set of safe mobile computing devices can be established, which when proximate or collocated with the object tracking device, prevent a notification from being issued.

For example, the object tracking device can be placed within a pet's collar. An anchor beacon can emit a signal that covers an owner's yard. The owner can also have a mobile communication device with location determination capabilities that is registered with a tracking server. When the pet leaves the yard and the range of the anchor beacon, a notification signal can be sent from the object tracking device to the tracking server. The tracking server can then determine whether the registered communication device is proximate to the pet, which indicates that the owner is walking the dog. If so, the tracking server can optionally issue one or more OTA commands to the tracking device, potentially altering a location measuring interval now that the pet is outside the range of the anchor beacon. Appreciably, the range can be based on a received signal quality and whether that quality exceeds a signal quality threshold established for the tracking device. The quality of a signal can be determined by any of many means known to those in the art. Examples include received signal strength, packet error rates, bit error rates, etc. Thus, the range can be any configurable value, not to exceed a maximum broadcast range of the anchor beacon.

In the example, if the mobile communication device is not proximate to the tracking device, the tracking server can issue a notice to the mobile communication device, such as calling or text messaging the pet owner, so that the owner is aware that, the pet has left the yard. The location of the pet can be continuously tracked by the tracking server until the pet is returned to the safe region. The tracking server can use the pet's location and a location of the mobile device to guide an owner to their wayward pet, In one embodiment, use of an anchor beacon is unnecessary. Instead, a geo fence boundary (i.e., a safe region) can he based upon a position of any mobile device, such as a mobile phone. The tracking device can be any other mobile device, such as a different mobile phone. The tracking server can determine a relative position of the two devices to each other. When the tracking device is outside the geo fence boundary (i.e., a mobile boundary centered upon the first mobile phone), the tracking server can automatically convey a notice to a designated caretaker. Thus, notifications are sent when the tracking device is not proximate to the mobile device. Additionally, multiple different mobile devices can establish multiple geo fence boundaries.

The present invention can be implemented in accordance with numerous aspects consistent with the material presented herein. For example, one aspect of the present invention can include a system for tracking objects comprising at least one anchor beacon, at least one object tracking device, and a tracking server. Each anchor beacon can broadcast a signal over a designated range, which can be user configurable. Each object tracking device can include a beacon sensor for detecting the signal broadcast by the beacon. The tracking device can also include a location detector and a wireless transceiver. The tracking server can automatically receive a message via the wireless transceiver when the beacon sensor is unable to detect the signal broadcast by the beacon or when the broadcast signal quality falls below an established signal quality threshold. The message can include a location of the object, tracking device. Multiple time spaced messages providing updated location information concerning the object tracking device can be repetitively received by the tracking server while the beacon sensor is unable to detect the signal broadcast. The tracking device can selectively notify one or more registered notification computing devices when the object tracking device is outside the designated range of the anchor beacon. Further, real-time guidance can be provided to the notification computing device, such as a mobile computing device, to help a user find the object tracking device.

Another aspect of the present invention can include a method of tracking objects. In the method, an anchor beacon can emit a broadcast over a range that is detectable by an object tracking device. The object tracking device can automatically detect a presence or absence of the broadcast as well as a signal broadcast quality. When the broadcast is present and has a quality greater than an established threshold, the object tracking device can take no action. When the broadcast is absent, the object tracking device can determine a current location for the object tracking device and can convey an OTA communication to a tracking server. The OTA communication can indicate the absence of the broadcast and can also include the current location. The tracking server can selectively send a notification to a previously designated communication device to notify a user that the object tracking device is outside the range.

Still another method of the present invention can include a method for associating anchor beacons with location tracking devices. Anchor beacons can be stationary or mobile devices. A signal can be broadcast from each anchor beacon over a range. An object tracking device attached to a movable object can selectively detect the signal. When no signal is detected during the selectively detecting step or when a detected signal is too weak, a location of the object tracking device can be determined. The determined location can be conveyed to a remotely located tracking server. The tracking server can selectively convey a notification to at least one previously designated communication device to notify a user that the object tracking device is outside the range. The steps of the method can be repeated until a safe state for the location tracking device is determined. A safe state can be entered when the object tracking device detects the signal, when the object tracking device detects a different signal broadcast from a different authorized anchor beacon, when the tracking server conveys an over the air command to the object tracking device that indicates a safe state, when the object tracking device detects a presence of a proximately located safe device, and/or when the object tracking device receives an approved signal from a proximately located safe device.

It should be noted that various aspects of the invention can be implemented as a program for controlling computing equipment to implement the functions described herein, or a program for enabling computing equipment to perform processes corresponding to the steps disclosed herein. This program may be provided by storing the program in a magnetic disk, an optical disk, a semiconductor memory, or any other recording medium. The program can also be provided as a digitally encoded signal conveyed via a carrier wave. The described program can be a single program or can be implemented as multiple subprograms, each of which interact within a single computing device or interact in a distributed fashion across a network space.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
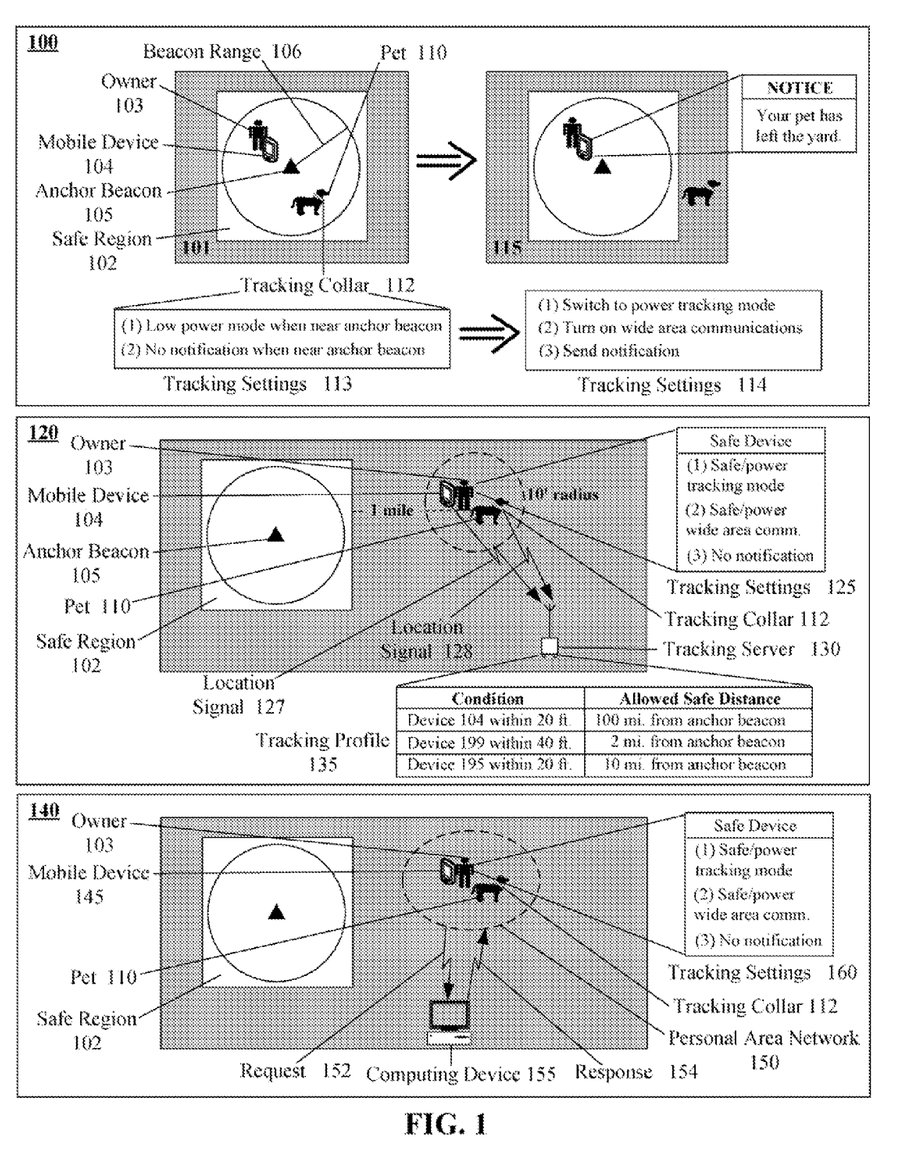
FIG. 1 is a set of diagrams that illustrate how a proximity of a tracking device to defined safe devices automatically results in notifications being sent when the tracking devices are away from the safe devices in accordance with the inventive arrangements disclosed herein.

FIG. 1 is a set of diagrams 100, 120, and 140 that illustrate how a proximity of a tracking device to defined safe devices automatically results in notifications being sent when the tracking devices are away from the safe devices in accordance with the inventive arrangements disclosed herein. Safe devices can include stationary and/or moving anchor beacons that define a safe region as well as specific mobile devices designated by a user.

Diagram 100 begins with example area 101 that defines the initial positions and settings of its components. Example area 101 can include a sale region 102 that can be created by an anchor beacon 105. The size of the safe region 102 can be governed by the beacon range 106. It should be appreciated that the size of the safe region 102 can vary in shape and size depending upon the number of anchor beacons 105 that are used to define the safe region 102, the type of broadcast signal output by the anchor beacon 105, and the presence of objects that block the anchor beacon's 105 signal within the safe region 102. A user can adjust a power setting of the anchor beacon 105 to adjust the range 106 and size of safe region 102 as well as one or more antenna orientations. Further, a user can establish a signal quality threshold that defines a designated range of permitted movement for the tracking device. Changing this threshold can change a permitted range from the anchor beacon, in diagrams 110, 120, and 140, it is assumed that the tracking device is set at a designated range, which is used to define the safe region 102.

An owner 103 and their pet 110 can be located within the safe region 102. Owner 103 can possess a mobile device 104. The pet 110 can wear a tracking collar 112 that contains a power conserving tracking device. While the pet 110 is within the safe region 102, the tracking collar 112 can operate under the shown tracking settings 113. These tracking settings 113 illustrate that the tracking collar 112 can function in a low power mode when near an anchor beacon 105 and that owner notifications are unnecessary in this situation.

However, should the pet 110 leave the safe region 102, as shown in example area 115, changes to the original tracking settings 113 can occur, resulting in a new set of tracking settings 114. This new set of tracking settings 114 can include a change in the power mode of the tracking collar 112 due to the activation of its wide area communications component, such as a WAN transceiver. Additionally, the new tracking settings can trigger the generation of a notification that can be sent to one or more designated devices. In this example, die owner 103 can receive the notification stating that the object has left the safe region 102 on their mobile device 104.

In diagram 120, the owner 103 can be walking their pet 110 outside of the safe region 102. The owner 103 can be in possession of their mobile device 104 while on the walk and this mobile device 104 can he designated as a safe device. Designation of the mobile device 104 as a safe device can result in it having associated tracking settings 125. As shown in this example, the tracking settings 125 can indicate that, an active tracking mode and wide area communications have been activated for the tracking device (collar 112), and that notifications are unnecessary. This is similar to the change in settings illustrated in diagram 100, where the tracking collar 112 can no longer remain in the low power mode.

When the pet 110 is proximate to the safe device, a notification to the owner 103 that their pet 110 is outside of the safe region is unnecessary, due to the pet's 110 proximity to the mobile device 104. In the active tracking mode, a tracking server 130 can receive location signals 127 and 128 from the mobile device 104 and tracking collar 112, respectively. With the locational information contained within the location signals 127 and 128, the tracking server 130 can determine the proximity of the tracking device (collar 112) to a safe device (mobile device 104) and the anchor beacon 105. The tracking server 130 can then use these determined distances to check against a user-defined tracking profile 135, As shown in this example, the tracking profile 135 can contain preset conditions and corresponding allowed safe distances. Since the tracking device (collar 112) meets the condition for the safe device (mobile device 104) and both devices are within the distance allowed from the anchor beacon 105, the tracking server 130 can determine that the pet 110 is intentionally outside of the safe region 102 and that this is not a cause for alarm. Other settings can be established in profile 135 for different devices having different owners. For example, a device 199 can be a mobile telephone carried by a child who is permitted to walk the pet 110 up to two miles from the yard so long as the child stays within forty feet of the pet 110. A different person associated with device 195 can be permitted to travel with the pet 110 up to fen miles from the yard so long as the pet 110 stays within twenty feet of device 195. It can be appreciated that a range of values for the "allowed safe distance" can include zero to infinity and all values in between.

In one embodiment, a special safe power mode can be employed that selectively turns on a WAN transceiver and detection component at a long iteration, such as once every fifteen minutes. This means a location of the pet 110 is conveyed to the tracking server 130 at fifteen minute intervals. If the pet 110 strays too far from the safe device, the tracking collar 112 can be adjusted to an active tracking mode, having a shorter iteration between location transmissions than the safe power mode. For example, the WAN transceiver and detection component can be activated once every five minutes in the active tracking mode, causing a location of the pet 110 to be sent to the server 130 every five minutes. In one configuration, distance transmission iterations can be dynamically shortened to conserve power when the power remaining in the tracking collar 112 is low.

Diagram 140 illustrates a situation similar to diagram 120, where the pet 110 is outside of the safe region 102 with its owner 103 who is carrying a mobile device 145. Unlike diagram 120, however, proximity between an owner 103 and a pet 110 can be based upon a personal area network 150 range. For example, both the mobile device 145 and the tracking collar 112 can be BLUETOOTH enabled devices, which are automatically aware of one another when within BLUETOOTH range. Broadcasts from the collar 112 to a tracking server 155 can occur only when the collar 112 is outside of the safe region 102 and outside of the BLUETOOTH range of device 145. The BLUETOOTH range is indicated by the dashed line labeled personal area network (PAN) 150. Appreciably, diagram 140 shows a configuration that permits the collar 112 to selectively remain in low power mode, even when outside of the safe region 102.

Communications that authorize the mobile device 145 as a safe device can occur between device 145 and a remotely located device 155, which can be a server hosting the tracking profile 160. The device 155 can send an authorization key to device 145, which is conveyed to the collar 112 via the PAN 150. When the authorization key is valid, the collar 112 can remain in a low power mode. In one embodiment the authorization key can automatically time-out, which allows the computing device 155 to account for profile parameters, such as distance from sale region 102. For example, the authorization key can expire every half hour, requiring a new updated key be requested 152. A new key can be conveyed within a response 154, when the mobile device 145 is located an allowed distance from region 102. When outside of this distance, no key will be sent in response 154, which causes collar 112 to shift from a low-power mode to an active tracking mode, which in turn results in a notice (not shown) being sent.

Figure 2:
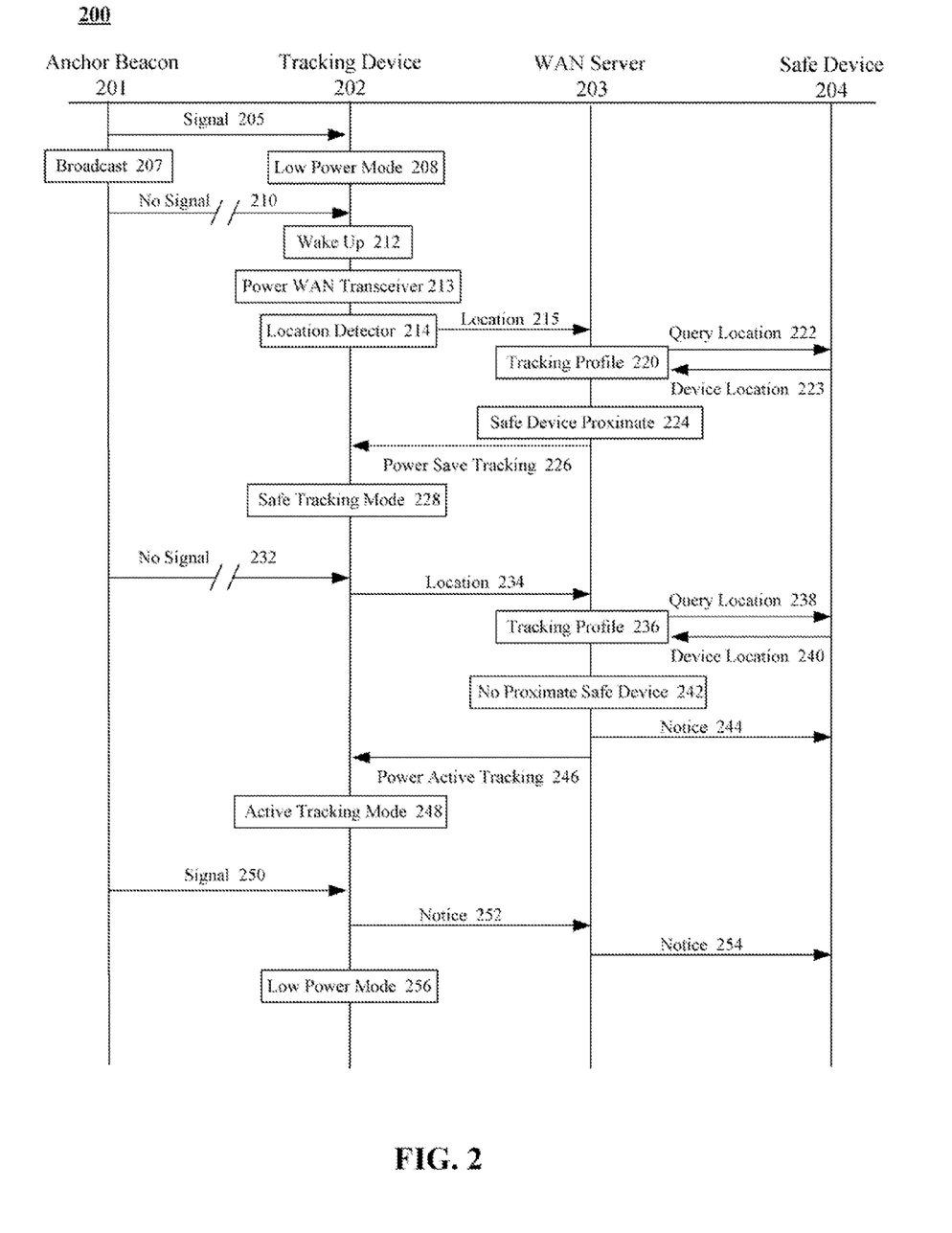
FIG. 2 is a graphical representation illustrating the basic interactions occurring within an object tracking system in accordance with an embodiment of the inventive arrangements disclosed herein.

FIG. 2 is a graphical representation 200 illustrating the basic interactions occurring within an object tracking system in accordance with an embodiment of the inventive arrangements disclosed herein. These interactions can occur between the following components: anchor beacon 201, tracking device 202, WAN server 203, and safe device 204.

Interaction can begin when the tracking device 202 receives signal 205 from the anchor beacon 201. Since the tracking device 202 can receive the signal 205 broadcast 207 from the anchor beacon 201, it can be determined that the tracking device 202 is within the safe region defined by the broadcast area of the anchor beacon 201. Therefore, the tracking device 202 can be placed in a low power mode 208. Since the anchor beacon 201 defines the safe region, it can be set in a state of constant broadcast 207.

Should the tracking device 202 not receive the signal front the anchor beacon 201, denoted by the broken no signal arrow 210, then it can be determined that the tracking device 201 has left the safe region defined by the anchor beacon 201. At this point, the tracking device 202 can be automatically taken out of the low power mode 208 through the execution of a wake up process 212. The wake up process 212 can activate the WAN transceiver 213 and location detector 214. Activation of these components can increase the power consumption of tracking device 202.

The location detector 214 can then determine the location of the tracking device 202 and send its location 215 to the WAN server 203. Upon receipt of this information, the WAN server 203 can access the tracking profile 220 associated with the tracking device 202. The contents of the tracking profile 220 can resemble the information illustrated in the tracking profile 135 of FIG. 1.

In order to determine what action defined in the tracking profile 220 is necessary, the WAN server 203 can attempt to determine the proximity of the tracking device 202 to a safe device 204. It should be appreciated that this step should be performed for each safe device 204 defined within the tracking profile 220. In order to make this determination, the WAN server 203 can query the location 222 of the safe device 204. The safe device 204 can respond to this query with its locational information 223.

Now that the WAN server 203 has the location of the tracking device 202 and the safe device 204, it can be determined if the tracking device 202 is within the defined distance of the safe device 204. Step 224 shows that the safe device is proximate, which results in a power saving tracking command 226 being sent to the tracking device 202. This command 226 causes device 202 to enter a safe tracking mode 228. In the safe tracking mode location information can be conveyed over a WAN at a long interval.

After the long interval, the tracking device 202 can determine that no beacon signal 232 is present. This causes a location 234 of the device 202 to be conveyed to WAN server 203. The server can again query the profile 236 for safe devices. Device 204 can be queried 238 for a location, which is provided in response 240. The WAN server 203 can determine 242 that the safe device 204 is now no longer proximate to the tracking device 202.

This first causes a notice 244 to be sent to safe device 204, it should be appreciated that the WAN server 203 can send the notice 244 to any receptive device designated by a user and that sending the notice 244 to the safe device 204 is merely an illustration of a possible configuration. Additionally, a power active tracking command 246 is to be issued from the server 203 to the tracking device 202. This command 246 can cause device 202 to be adjusted from safe tracking mode to an active tracking mode 248. The active tracking mode 248 can have a shorter interval for conveying current location information to server 203.

After this short duration, the tracking device 202 can check for a signal 250 from an anchor beacon 201, which is present. This means that the device 202 is now in a safe region. A notice 252 to this effect can be sent to the WAN server 203, which can send a similar notice 254 to the safe device 204, so the owner or guardian is no longer worried about the object associated with the tracking device 202. The tracking device 202 can shift back from the active tracking mode to the low power mode 256.

It should be appreciated that derivatives of the arrangements shown in diagram 200 are contemplated and are to be considered within the scope of the present invention. For example, in one contemplated configuration, the invention can be implemented without the anchor beacon 201. That is, proximity between the tracking device 202 and the safe device 204 can determine whether a tracking server sends a notice to a designated notification device (e.g., a caretaker's device).

Figure 3:
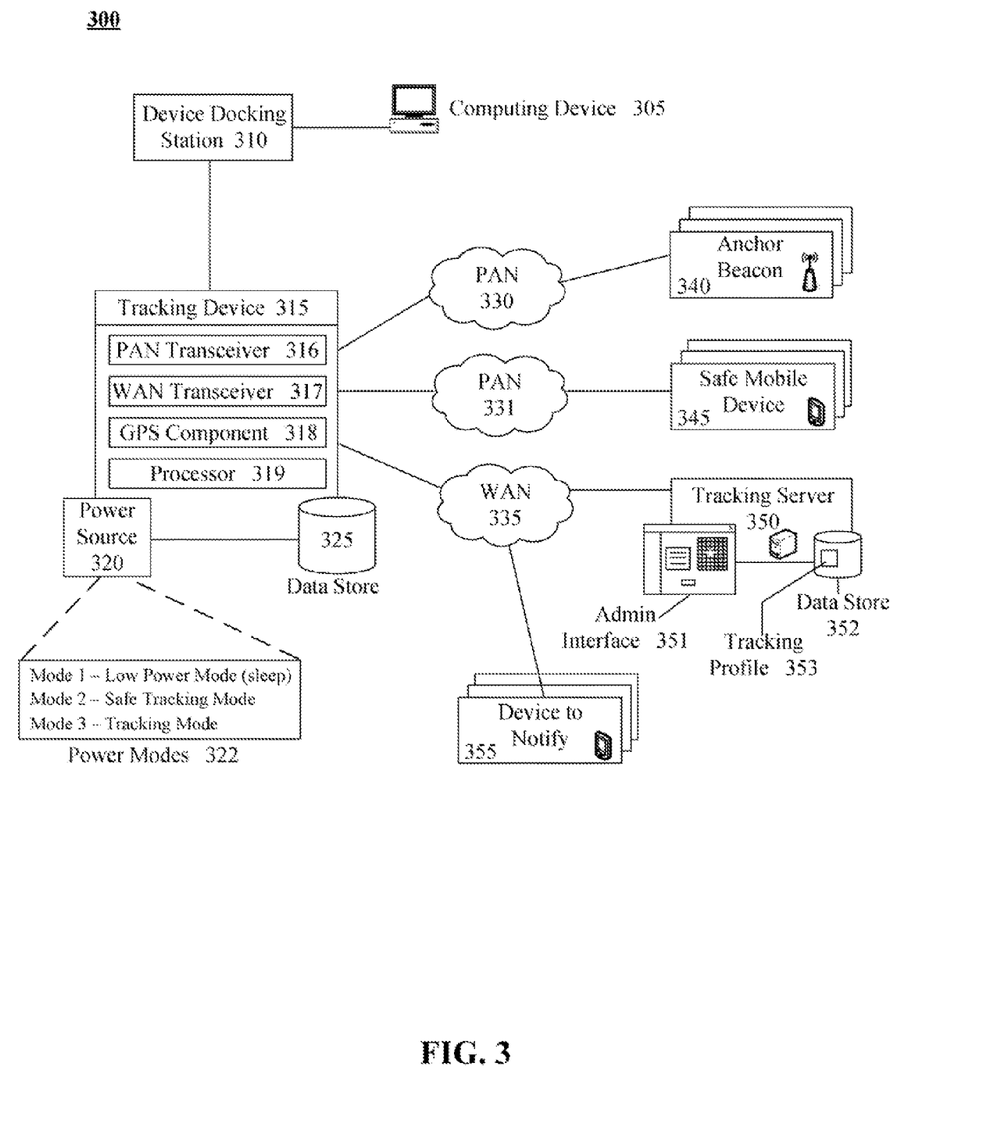
FIG. 3 is a schematic diagram of a system that selectively notifies concerned parties when a tracking device is outside a region defined as safe in accordance with an embodiment of the inventive arrangements disclosed herein.

FIG. 3 is a schematic diagram of a system 300 that selectively notifies concerned parties when a tracking device is outside a region defined as safe in accordance with an embodiment of the inventive arrangements disclosed herein. System 300 can include a tracking device 315 that can be placed within an optional docking station 310 connected to a computing device 305. The tracking device 315 can be attached to the docking station 310 in a variety of ways, such a wirelessly through a BLUETOOTH connection or physically with a Universal Serial Bus (USB) cable. When attached to the docking station 310, the tracking device 315 can recharge its power source 320 and exchange information with the computing device 305. Computing device 305 can provide the tracking device 315 with configuration data.

The tracking device 315 can include additional components such as a PAN transceiver 316, a WAN transceiver 317, a GPS component 318, a processor 319, a power source 320, and a data store 325. It should be appreciated that the processor 319 and data store 325 are required to conduct the automated adjustment of power and communication components. The data store 325 can store device specific information, such as a signal quality threshold that is used to define a designated range that the device is allowed to be from an anchor beacon 340.

The PAN transceiver 316 can receive signals broadcast from the anchor beacon 340 over PAN 330. The PAN transceiver 316 can also communicate with one or more safe mobile devices over PAN 331. In one embodiment, different PAN transceivers 316 can be required for PAN 330 and 331. For example, PAN 330 can be a 802.11 based wireless network (WIFI) and PAN 331 can be a BLUETOOTH based network.

The WAN transceiver 317 can communicate its locational information to the tracking server 350 via WAN 335. Over the WAN 335, the tracking server 350 can send the tracking device 315 instructions as well as send notifications to a designated device to notify 355. In an alternate embodiment, the device to notify 355 can be a safe mobile device 345.

The tracking server 350 can include an administration interlace 351 and a data store 352. The tracking profile 353 for the tracking device 315 can be contained within this data store 352. A user can use the administration interface 351 to configure the tracking profile 353 for the tracking device 315. This can include designating a safe mobile device 345, an allowed distance from an anchor beacon 340, and a device to notify 355. A user can access the administration interface 351 via computing device 305. For example, a user could access the interface over the Internet from a mobile telephone.

The power source 320 of the tracking device 315 can include power modes 322. As shown in this example, the power source 320 supports three power modes 322. The low power mode can be analogous to a sleep mode and can be invoked when the tracking device 315 is within the safe region. The tracking mode can be analogous to a full power mode and can be invoked when the tracking device 315 is outside of the safe region and not proximate to a safe device; the system 300 is actively trying to locate the object. Should the tracking device be proximate to a sale mobile device 345, the safe tracking mode can be invoked, which consumes less power than the active tracking mode.

As used herein, presented data stores, including stores 325 and 352, can be a physical or virtual storage space configured to store digital information. Data stores 325 and 352 can be physically implemented within any type of hardware including, but not limited to, a magnetic disk, an optical disk, a semiconductor memory, a digitally encoded plastic memory, a holographic memory, or any other recording medium. Each of the data stores 325 and 352 can be a stand-alone storage unit as well as a storage unit formed from a plurality of physical devices. Additionally, information can be stored within data stores 325 and 352 in a variety of manners. For example, information can be stored within a database structure or can be stored within one or more files of a file storage system, where each file may or may not be indexed for information searching purposes. Further, data stores 325 and/or 352 can utilize one or more encryption mechanisms to protect stored information from unauthorized access.

WAN 335 can include any hardware/software/and firmware necessary to convey data encoded within carrier waves. Data can be contained within analog or digital signals and conveyed though data or voice channels. WAN 335 can include local components and data pathways necessary for communications to be exchanged among computing device components and between integrated device components and peripheral devices. WAN 335 can also include network equipment, such as routers, data lines, hubs, and intermediary servers which together form a data network, such as the Internet. WAN 335 can also include circuit-based communication components and mobile communication components, such as telephony switches, modems, cellular communication towers, and the like. WAN 335 can include line based and/or wireless communication pathways.

Figure 4:
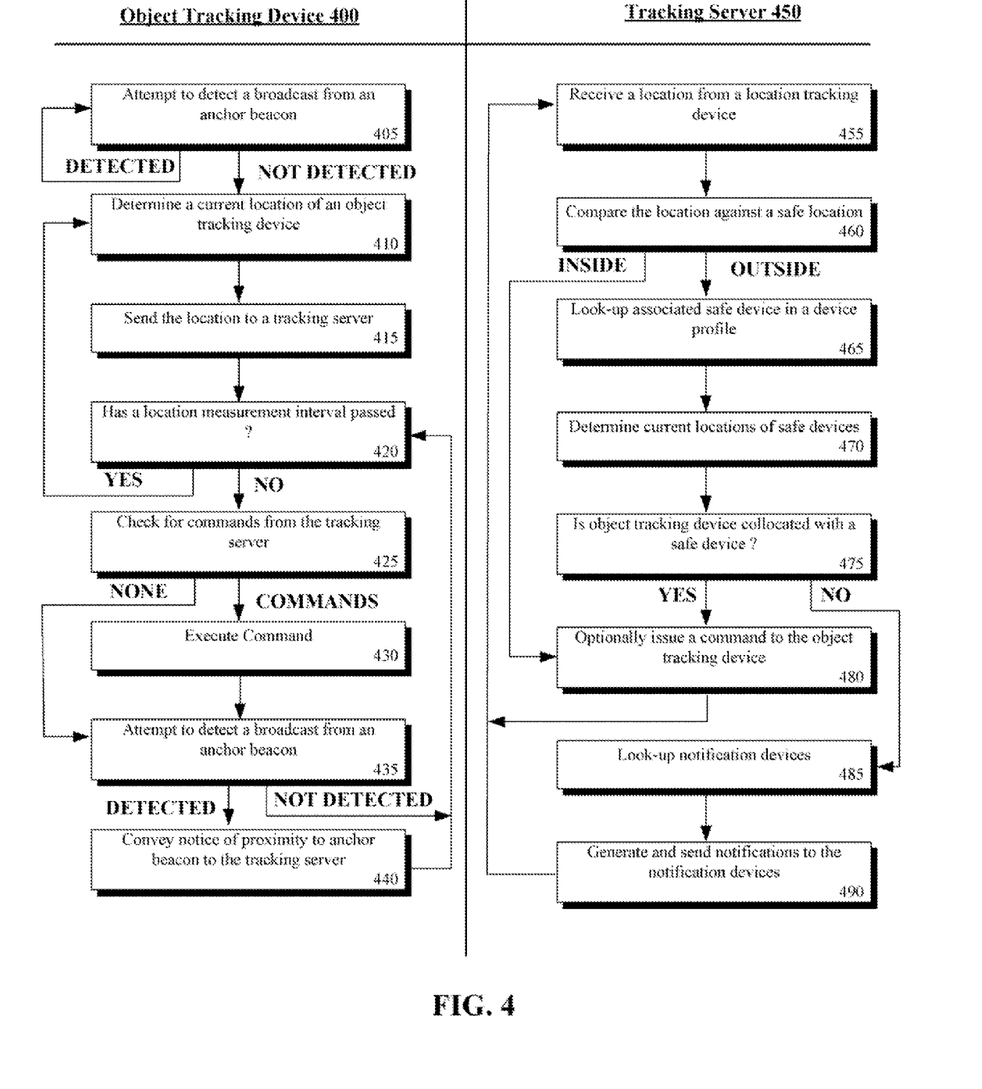
FIG. 4 illustrates two flow charts which depict how an object tracking device and a tracking server interact in accordance with an embodiment of the inventive arrangements disclosed herein.

FIG. 4 illustrates two flow charts which depict how an object tracking device 400 and a tracking server 450 interact in accordance with an embodiment of the inventive arrangements disclosed herein. The illustrated flow charts can be performed in the context of system 300.

A flow chart for a method enacted for the object tracking device 400 can begin in step 405, where an attempt can be made to detect a broadcast from an anchor beacon. When the broadcast is detected and has a quality greater than an established threshold, the method can loop back to step 405. When not detected, the method can proceed to step 410, where a current location for an object tracking device can be determined. In step 415, the determined location can be sent to a tracking server.

In step 420, a location measurement interval can be checked. When this interval has passed, the method can loop from step 420 to step 410, where a new location for the object tracking device can be determined and can be sent to the tracking server. When the interval has not passed in step 420, the object tracking device can check for commands from the tracking server in step 425. When a command is received, it can be executed, as shown in step 430. For example, a command can be issued to adjust the location measurement interval, to change from a "lost" state to a safe state, to detect a proximate safe device, or to perform any other location detection action or adjustment.

When no command is detected or after a command has executed, step 435 can occur, where another attempt to detect a broadcast from an anchor can be made. When detected, a notice to that effect can be conveyed to the tracking server in step 440. When no broadcast is detected or when the notice has already been conveyed, the method can loop to step 420, where the location measurement interval can again be checked.

A flow chart for a method enacted for the tracking server 450 can begin in step 455, where a location can be received from a location tracking device, which indicates that the device was unable to detect a proximate anchor beacon. In step 460, the device location can be compared against one or more safe locations. In one situation, the object tracking device can be in a safe location and either an anchor beacon can be malfunctioning or can be absent for some unknown reason. If inside the safe location, the method can proceed from step 460 to step 480, where a command can be optionally issued to the object tracking device. The command could, for example, be a command for the object tracking device to continue to seek an anchor beacon broadcast.

When the location is outside the safe area in step 460, the method can proceed to step 465 where a device profile can be accessed to look up safe devices. In step 470, locations for any found safe devices can be determined. In step 475, a determination can be made as to whether the object tracking device is collocated with a safe device. If the devices are collocated, a command can be optionally issued to the object tracking device, as shown by step 480. For example, the tracking server can issue a command for the object tracking device to adjust a location measurement interval.

If the location tracking object is not collocated in step 475, the method can proceed to step 485, where devices for the tracking server to notify can be looked up. These devices can include mobile communication devices, computers, fax machines, Web servers associated with an object tracking Web site, and the like. In step 490, the notifications can be generated and sent to the appropriate notification devices. When one of the notification devices is a mobile communication device that the tracking server can locate, the tracking server can issue directions guiding the mobile communication device to the object tracking device. The method can loop from step 480 and/or 490 to step 455, where the tracking of the object tracking device 400 can continue.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. System for tracking objects comprising:
   at least one anchor beacon configured to broadcast a signal over a designated range;
   at least one object tracking device comprising a beacon sensor configured to detect the signal broadcast by the beacon, the tracking device also comprising a location detector and a wireless transceiver; and
   a tracking server configured to automatically receive a message via the wireless transceiver that is automatically sent from the object tracking device when the beacon sensor is unable to detect the signal broadcast by the beacon, wherein the message includes a location of the object tracking device, and wherein messages providing updated location information concerning the object tracking device are repetitively received by the tracking server while the beacon sensor is unable to detect the signal broadcast.

2. The system of claim 1, further comprising:
   the tracking server being configured to issue over the air commands to the location tracking device, at least one of the commands being a location reporting interval command, wherein receipt of the location reporting interval command causes the object tracking device to adjust a location measurement interval for which the location detector determines a location and for which the wireless transceiver conveys the determined location to the tracking server.

3. The system of claim 1, further comprising:
   at least one notification device registered with the tracking server, wherein tracking server is configured to selectively convey notifications to each of the notification devices, said notifications indicating a current location of the object tracking device.

4. The system of claim 3, wherein at least one notification device is a mobile telephone device having location detection capabilities, wherein the tracking server is configured to guide a user of the mobile telephone device to the object tracking device whenever the beacon sensor is unable to detect the signal broadcast.

5. The system of claim 3, further comprising:
at least one safe device registered with the tracking server, wherein the tracking server is configured to determine whether any of the registered safe devices are proximate to the object tracking device, wherein the selective conveying of the notifications is based upon whether the tracking server determines that a registered safe device is proximate to the object tracking device.

6. The system of claim 1, wherein the location tracking object is attached to a pet, and wherein the system is used to monitor a location of the pet.

7. The system of claim 1, wherein the at least one anchor beacon is a plurality of anchor beacons, wherein at least one of the plurality has a user configurable range, and wherein at least one of the plurality is a mobile anchor beacon.

8. A method for associating beacons with location tracking devices comprising:
broadcasting a signal from at least one anchor beacon over a range;
an object tracking device attached to a movable object selectively detecting the signal;
when no signal is detected during the selectively detecting step, determining a location of the object tracking device;
conveying the determined location to a remotely located tracking server;
the tracking server selectively conveying a notification to at least one previously designated communication device to notify a user that the object tracking device is outside the range; and
repeating the determining step, and the conveying steps until a safe state is determined, wherein the determination of said safe state results from an occurrence of an event selected from a group of events consisting of an event where the object tracking device detects the signal, an event where the object tracking device detects a different signal broadcast from a different authorized anchor beacon, an event where the tracking server conveys an over the air command to the object tracking device that indicates a safe state, an event where the object tracking device detects a presence of a proximately located safe device, and an event where the object tracking device receives an approved signal from a proximately located safe device.

9. The method of claim 8, further comprising:
registering a plurality of safe devices with the tracking server;
detecting whether any of the safe devices is within a predetermined range of the object tracking device; and
the tracking server conveying the notification only when the object tracking device is not within the previously designated range of any registered safe device.

10. The method of claim 8, further comprising:
the tracking server conveying an over the air command to the object tracking device; and
the object tracking device performing at least one programmatic action responsive to receiving the command, wherein the over the air command is at least one command selected from a group of commands consisting of a command to control a frequency with which the object tracking device conveys location update information, a command causing the object tracking device to listen for the signal, a command causing the object tracking device to detect a presence of at least one safe device, and a command to enter the safe state.

11. The method of claim 8, wherein the movable object is a living entity.

12. The method of claim 11, wherein the movable object is a pet.

13. The method of claim 8, wherein at least one machine in accordance with at least one computer program having a plurality of code sections stored within a machine readable memory accessible by the at least one machine, said code sections being executable by the at least one machine.

* * * * *